(12) United States Patent
Soulez et al.

(10) Patent No.: US 11,166,158 B2
(45) Date of Patent: *Nov. 2, 2021

(54) IDENTITY AND PHONE NUMBER VERIFICATION

(71) Applicant: NEXMO, Inc., San Francisco, CA (US)

(72) Inventors: Thomas Gilles Michel Soulez, London (GB); Boaz Zehavi, London (GB); Guillermo Quintero, San Diego, CA (US); Aurelien Favre, London (GB); Jean-Philippe Chenot, London (GB)

(73) Assignee: Nexmo, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,490

(22) Filed: Jul. 14, 2020

(65) Prior Publication Data

US 2020/0351658 A1 Nov. 5, 2020

Related U.S. Application Data

(63) Continuation of application No. 16/435,819, filed on Jun. 10, 2019, now Pat. No. 10,716,003, which is a (Continued)

(51) Int. Cl.
*H04W 12/06* (2021.01)
*H04L 29/06* (2006.01)
(Continued)

(52) U.S. Cl.
CPC ......... *H04W 12/06* (2013.01); *H04L 61/2007* (2013.01); *H04L 63/083* (2013.01);
(Continued)

(58) Field of Classification Search
CPC ............................. H04L 2209/80; G06F 21/35
(Continued)

(56) References Cited

U.S. PATENT DOCUMENTS 5,720,003 A 2/1998 Chiang et al.
9,461,998 B2 10/2016 Hettervik et al.
(Continued)

FOREIGN PATENT DOCUMENTS

EP 1 289 202 A1 3/2003

OTHER PUBLICATIONS

Aug. 25, 2015 International Search Report & Written Opinion issued in PCT/US2015/031535.

(Continued)

*Primary Examiner* — Kiet M Doan
(74) *Attorney, Agent, or Firm* — FisherBroyles, LLP; Joseph Pagnotta

(57) ABSTRACT

Methods, systems, and apparatus, including computer programs encoded on a computer storage medium, for receiving, from a computer system, a request comprising a phone number, identifying a primary channel and one or more secondary channels based on, at least in part, respective performance data of the primary and secondary channels, sending a first message comprising a first text string via the primary channel to a destination device associated with the phone number, after sending the first message, determining that a conversion event for the message and the primary channel did not occur within a specified time period, and based on the determining, sending a second message comprising the first text string via a particular secondary channel to the destination device.

21 Claims, 3 Drawing Sheets

Related U.S. Application Data continuation-in-part of application No. 15/905,772, filed on Feb. 26, 2018, now Pat. No. 10,321,315, which is a continuation of application No. 15/369,617, filed on Dec. 5, 2016, now Pat. No. 9,906,955, which is a continuation of application No. 14/552,349, filed on Nov. 24, 2014, now Pat. No. 9,516,480.

(51) Int. Cl.
*H04M 3/42* (2006.01)
*H04W 4/14* (2009.01)
*H04L 29/12* (2006.01)

(52) U.S. Cl.
CPC ......... *H04M 3/42042* (2013.01); *H04W 4/14* (2013.01); *H04L 63/18* (2013.01)

(58) Field of Classification Search
USPC ............................... 705/44, 12, 40; 370/336
See application file for complete search history.

(56) References Cited

U.S. PATENT DOCUMENTS

| | | |
|---|---|---|
| 2005/0054346 A1 | 3/2005 | Windham et al. |
| 2008/0275785 A1 | 11/2008 | Altberg et al. |
| 2011/0238766 A1 | 9/2011 | Lew et al. |
| 2011/0252144 A1 | 10/2011 | Tung et al. |
| 2012/0117178 A1 | 5/2012 | Price et al. |
| 2012/0210408 A1 | 8/2012 | Lu et al. |
| 2012/0330856 A1 | 12/2012 | Hyder et al. |
| 2013/0036458 A1 | 2/2013 | Liberman et al. |
| 2013/0239173 A1 | 9/2013 | Dispensa |
| 2014/0075525 A1 | 3/2014 | Ferlin |
| 2015/0295930 A1 | 10/2015 | Dixon et al. |
| 2016/0043867 A1* | 2/2016 | Bonsignore ............. G06F 21/34 713/168 |

OTHER PUBLICATIONS

Dec. 21, 2015 International Search Report issued in International Application No. PCT/US2015/050475.

Dec. 21, 2015 Written Opinion issued in International Application No. PCT/US2015/050475.

Nexmo SMS Deliverability Guide (https://web.archive.org/web/20121021023442/http://nexmo.com/download/nexmo_sms_deliverability guide.pdf), Oct. 21, 2012, 10 pages.

* cited by examiner

IDENTITY AND PHONE NUMBER VERIFICATION

IDENTITY AND PHONE NUMBER VERIFICATION

This application is a continuation of application Ser. No. 16/435,819 filed Jun. 10, 2019, which is a continuation-in-part of application Ser. No. 15/905,772, which was filed on Feb. 26, 2018, which issued as U.S. Pat. No. 10,321,315 on Jun. 11, 2019, which itself is a continuation of application Ser. No. 15/369,617, which was filed on Dec. 5, 2016, and which issued as U.S. Pat. No. 9,906,955 on Feb. 27, 2018, which was a continuation of application Ser. No. 14/552,349, which was filed on Nov. 24, 2014, and which issued as U.S. Pat. No. 9,516,480 on Dec. 6, 2016, the contents of all of which are incorporated herein by reference.

BACKGROUND

This specification relates generally to user authentication and, in particular, to identity and phone number verification.

Two-factor authentication is a method for authenticating a user's identity by combining two different factors associated with the user. Each factor can be an object that the user possesses (e.g., a bank card, a mobile phone, a key, a driver's license), information the user knows (e.g., a password, a birth date, a Personal Identification Number or PIN number), or a characteristic of the user (e.g., one or more fingerprints, a signature, facial look). The user's identity can be authenticated when both factors are verified. Two-factor authentication is generally more secure than single factor authentication.

SUMMARY

In general, one aspect of the subject matter described in this specification can be embodied in methods that include the actions of receiving, from a computer system, a request comprising a phone number; identifying a primary channel and one or more secondary channels based on, at least in part, respective performance data of the primary and secondary channels; sending a first message comprising a first text string via the primary channel to a destination device associated with the phone number; after sending the first message, determining that a conversion event for the message and the primary channel did not occur within a specified time period; and based on the determining, sending a second message comprising the first text string via a particular secondary channel to the destination device. The action of receiving, identifying, sending, and determining can be performed by one or more computer processors. Other embodiments of this aspect include corresponding systems, apparatus, and computer programs.

These and other aspects can optionally include one or more of the following features. The aspect can further comprise sending the computer system a fail message for the request. Determining a conversion event based upon the first text string can comprises receiving, from the computer system, a second text string submitted by a user of the destination device, and determining whether the second text string matches the first text string. Receiving the second text string can further comprises receiving, from the computer system, an Internet Protocol (IP) address for the destination device and determining whether the IP address is associated with the user. Determining that the conversion event did not occur can comprise determining that the primary channel failed to deliver a corresponding message within the specified time period. Receiving and sending can be via one or more application program interfaces. A particular channel can be a voice channel and a corresponding message can be a voice message comprising a spoken version of the first text string. A particular channel can be a messaging channel and a corresponding message can be a short message service (SMS) message comprising the first text string. Performance data of a particular channel can comprise a rate of conversion events of past messages sent via the particular channel, or current connection status to the particular channel. Identifying primary and secondary channels can further comprise ranking the channels based on respective performance data. Identifying primary and secondary channels can be further based on local regulation of respective carriers of the channels. Identifying primary and secondary channels can be further based on a device type of the destination device. The first text string can be a one-time password.

Particular implementations of the subject matter described in this specification can be implemented to realize one or more of the following advantages. The system described herein verifies a phone number of a user by using one or more distinct communication channels to reach the user. The system can fail over to different channels automatically based on past performance of the channels. The system can take into account local telecommunication regulations when communicating with users. The system can receive requests for verifying phone numbers and provide verification results via a single application program interface.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A business (e.g., a retailer, bank, or instant messaging service) can use a two-factor authentication method to authenticate a user's identify. For instance, when a user signs up for an online access at a bank's website, the bank (e.g., servers hosting the website) can send a PIN number to a phone number associated with the user. The user can submit the PIN number at the website. The bank thus can confirm the user's identity if the PIN number submitted by the user matches the PIN number sent to the phone number.

However, problems can occur when the PIN number cannot be successfully delivered to the user. For instance, the phone number is of a land-line phone and the PIN number is sent to the phone number in a text message. As another example, a connection to the phone number may not be available when the bank sends the PIN number to the phone number.

Particular implementations of the subject matter described in this specification describe methods for identity and phone number verification, for example, by delivering a PIN number (or other message) to a phone number using a best available communication channel.

Figure 1:
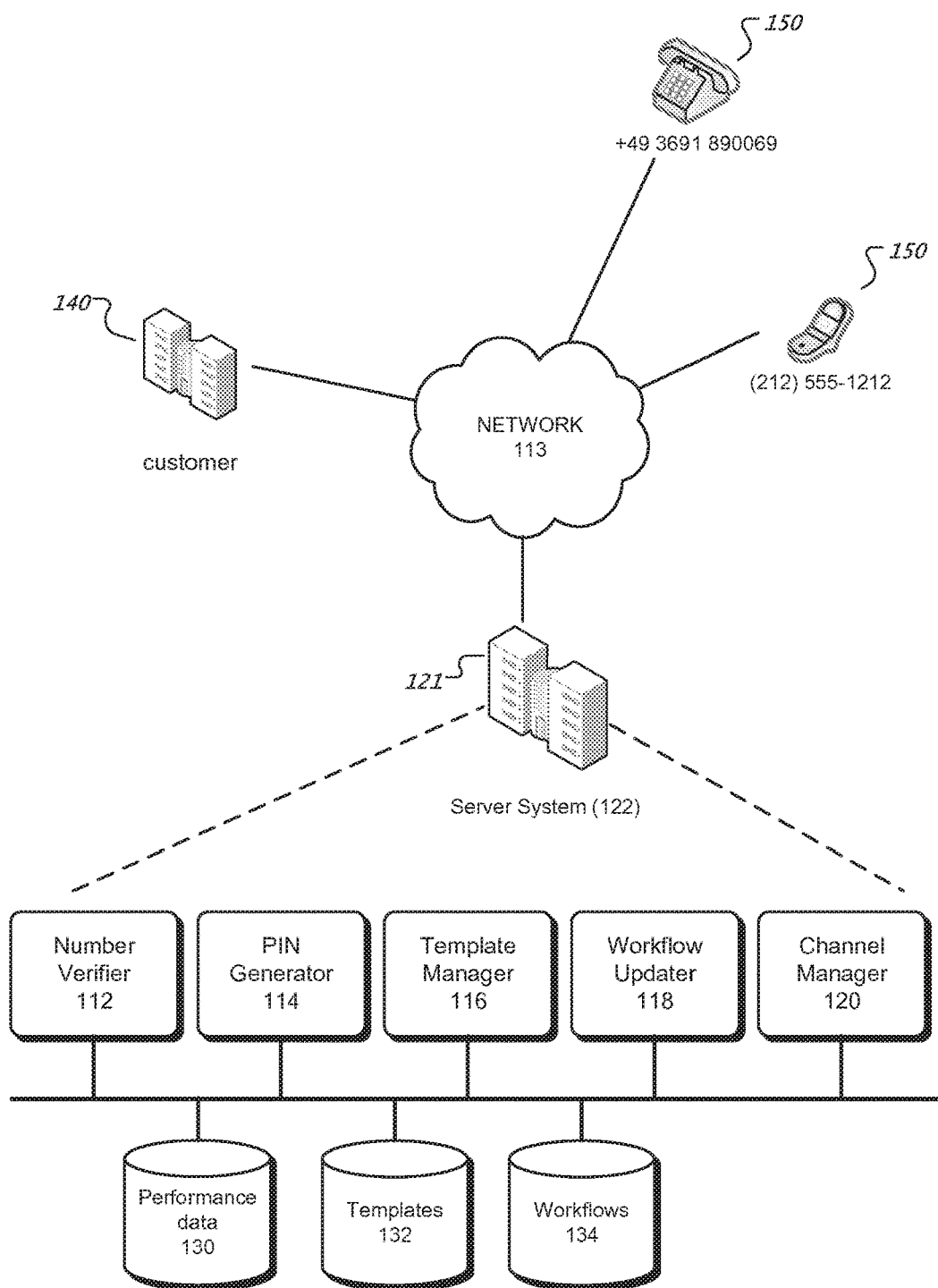
FIG. 1 illustrates an example system for identity and phone number verification.

FIG. 1 illustrates an example system for identity and phone number verification. A server system 122 provides functionality for identity and phone number verification. The server system 122 comprises software components and databases that can be deployed at one or more data centers 121 in one or more geographic locations, for example. The server system 122 software components comprise a number verifier 112, a PIN generator 114, a template manager 116, a workflow updater 118, and a channel manager 120. The software components can comprise subcomponents that can execute on the same or on different individual data processing apparatus. The server system 122 databases comprise a performance database 130, a templates database 132, and a workflows database 134. The databases can reside in one or more physical storage systems. The software components and data will be further described below.

The number verifier 112 is a software component that receives a request from a computer system 140 of a customer (e.g., a retailer, bank, or online service provider). The computer system 140 comprises one or more data processing apparatus at the same or different geographic locations. The request comprises a phone number of a user that the customer wants to verify. The number verifier 112 can receive the request from the computer system 140 through one or more data communication networks 113 such as the Internet or a public switched telephone number (PSTN), for example.

More particularly, the number verifier 112 can receive the request from the computer system 140 via an application program interface (API). For instance, the computer system 140 can submit a request by an API call with the following input fields:

API access key
API secret key
Phone number
Language
Code length
Brand
SenderID

API access key and API secret key are used to verify the request is from the customer. Phone number is a phone number that the customer wants to verify. Language is the language setting that is used for a message to be sent to the phone number. There can be a default language setting for the message if this input field is not used. Code length is the number of digits of a PIN number (or a length of a password text string) that is going to be sent (as part of the message) to the phone number. Brand is the customer's brand, service, or company name (or a phrase or sentence including the name) that is going to be sent (as part of the message) to the phone number. SenderID is used when the message is a short message service (SMS) message. Fewer or more input fields are possible. In an alternate embodiment of the invention, the PIN number is created manually by the customer and is inserted into the API call. For example, in such a manual PIN generation scenario, the field Code length is provided with a NULL value or ignored altogether and a new field pin code is populated with the manually generated PIN number. In one embodiment of the invention, the PIN is an alpha-numeric value of 4-10 characters; however, other values known to those skilled in the art are within the scope of the invention.

After receiving the request from the computer system 140 via the API, the number verifier 112 can provide output to the computer system 140 using the following output fields of the API:

RequestID
Workflow
Status

RequestID is an identifier for the request that can be used later for verifying the user and phone number, by providing a PIN number submitted by the user, as will be further described below. Workflow is a list of communication channels that can be used to send the message to the phone number. The list of communication channels will be further described below. Status indicates whether the request is accepted or rejected. For instance, the number verifier 112 can reject the request if the phone number provided by the computer system 140 is not valid (e.g., with a wrong number of digits), or the phone number has been verified before as an invalid or fake number. An invalid or fake number can be stored in the performance data database 130. The number verifier 112 can also reject the request if the phone number is of specific prefixes, networks, or number types. For instance, the number verifier 112 can reject a phone number with a prefix for toll-free numbers (e.g., 800-prefix in the United States), or a phone number for directory assistance (e.g., an area code and 555-1212 in the United States). Other output fields are possible.

The PIN generator 114 is a software component that generates a password to be included for the message to be sent to the phone number. In some implementations, a password can be a text string. A password can be a series of numerical digits or a PIN number. A number of digits in a PIN number or a length (character count) of a text string can be specified by the Code length value described above. More particularly, the password can be a one-time password. The PIN generator can generate a one-time password, for example, by applying a hash function to a combination of a secret key (or a previous password) and a time stamp, or additionally the phone number. The PIN generator can retire the one-time password after a pre-determined period of time (e.g., 15 minutes) from the time of the time stamp, such that it is unlikely the one-time password can be re-used later on.

The template manager 116 is a software component that accesses templates stored in the templates database 132 and composes the message (to be sent to the phone number) by inserting at least the brand name received in the request, and the password (e.g., a PIN number) generated by the PIN generator, into a template. The template can be specific to the language setting, or to the customer.

The workflow updater 118 is a software component that creates a list of communication channels to be used to send the message to a destination device 150 associated with the phone number. A destination device 150 can be a cell phone, a fixed-line (land-line) phone, or a computing device supporting a voice over Internet Protocol (VOIP) function. Other examples of a destination device 150 are possible. A communication channel can be a message channel for SMS messages or instant messages. A communication channel can be a voice channel for a voice call (e.g., a phone call). A communication channel can be a message channel for OverTheTop (OTT) applications running IP messaging technologies. Non-limiting examples of such OTT applications include WhatsApp Messenger developed by WhatsApp Inc. (now owned by Facebook, Inc.), Viber by Rakuten Inc. Facebook Messenger developed by Facebook, Inc., WeChat developed by Tencent Holdings Limited, Line developed by Line Corporation, Skype developed Skype Technologies and [here]?

For a voice channel, the template manager 116 can compose a spoken version of the message to be sent to the phone number via the voice channel, for example, by using a text-to-speech (TTS) software program. In some implementations, spoken versions of templates and numerical numbers can be stored in the templates database 132. For a voice channel, the template manager 116 can compose the message by using spoken versions of a template and numerical numbers for a PIN number stored in the templates database 132.

The channel manager 120 is a software component that sends the message to the destination device 150 through a particular communication channel, for example, by directing the message to a carrier of the particular channel. The carrier can deliver the message through the network 113, for example.

More particularly, the workflow updater 118 can identify a primary channel and one or more secondary channels for sending the message to the destination device 150. The channel manager 120 sends a message to the destination device 150, starting from the primary channel. If the delivery of the message via the primary channel has failed (e.g., as notified by a carrier of the primary channel), or a conversion event has not happened within a specified time period (e.g., 45 seconds), then the channel manager 120 sends another message via a secondary channel. A conversion event happens when the phone number is verified based on the password included in the message sent to the phone number. Conversion events will be further described below.

In some implementations, the channel manager 120 may direct a carrier of a voice channel to terminate delivery of a voice message via the voice channel if a voicemail (a function implemented by hardware or software) picks up the voice message. If this happens, the channel manager 120 determines that the delivery of the voice message has failed. In this way, the password is not left in the voicemail that may be accessible by another person other than the intended user.

If deliveries via the secondary channels also fail, or no conversion event has occurred within a specified time period for each secondary channel, the channel manager 120 determines that the request for verifying the phone number has failed. A fail message can be provided to the computer system 140 by the number verifier 112.

The workflow updater 118 can identify a primary channel and one or more secondary channels based on a device type of the destination device 150. For instance, if the destination device 150 is a cellular phone, the workflow updater 118 can designate the cellular phone's SMS message service as the primary channel, and the voice channel (phone calls) as a secondary channel, since SMS messages can be less intrusive for the user of the destination device 150. The workflow updater 118 can also designate the cellular phone's SMS message service as the primary channel, and as a secondary channel, and designate the voice channel as another secondary channel. In this way, the channel manager 120 can first sends a message through the SMS message, if no conversion event happens, the channel manager 120 can re-try the SMS message service, before initiating a phone call through the voice channel. Similarly, the workflow updater 118 can also designate an IP Messaging OTA application as the primary channel and designate the SMS message service as the secondary channel. In this way, the channel manager 120 can first send a message through the OTA application. If no conversion event happens, the channel manager 120 can initiate an SMS message as the secondary channel. Additionally, one or more additional secondary channels can be added to the workflow updater 118 to account for multi-channel non-conversion. That is, if the SMS message (as the secondary channel described just above) were not to be converted, then a voice call could be initiated to send a message via the voice channel. As another example, if the destination device 150 is a land-line phone, the workflow updater 118 can designate the fixed-line phone's voice channel as the primary and secondary channels, since messaging services may not be available for the fixed-line phone. One skilled in the art can create various combinations of primary and secondary channels to achieve the desired effect of reaching the destination device 150 in the most efficient manner.

The workflow updater 118 can identify a primary channel and one or more secondary channel based on local regulation of respective carriers of the channels. For instance, local regulation may prohibit text messages delivered to a phone number without an existing consent (e.g., not on a do-not-call list) or a pre-approved code (e.g., SenderID described earlier). If an existing consent or a pre-approved code is not available for the phone number for the destination device 150, the workflow updater 118 can designate the voice channel of the phone number as the primary and secondary channels.

The workflow updater 118 can identify a primary channel and one or more secondary channels based on respective performance data of the primary and secondary channels. The workflow updater 118 can access performance data stored in the performance data database 130. Performance data of a communication channel can be a conversion rate of the channel—i.e., a ratio of a number of conversion events to a total number of messages sent via the channel, for example, over the past month. In some implementations, a conversion rate can be measured for a group of phone numbers, such as phone numbers having a same prefix in North America Numbering plan (e.g., phone numbers from (415) 575-0000 to (415) 575-9999). Performance data of a communication channel can be a current connection status (e.g., currently available, intermittently available for the past five minutes, or currently unavailable) of the communication channel. For instance, the workflow updater 118 can designate a channel that is currently available as the primary channel and another channel that is intermittently available as a secondary channel.

The workflow updater 118 can rank the channels based on respective performance data and identify primary and secondary channels based on the ranking. For instance, the workflow updater 118 can rank available channels based on respective conversion rates, and designate a channel with the highest conversion rate as the primary channel, another channel with the second highest conversion rate as a "first" secondary channel, and so on.

The workflow updater 118 can identify a primary channel only. That is, only one attempt of delivering the message to the destination device 150 is performed by the channel manager 120.

The workflow updater 118 can identify primary and secondary channels based on a pre-defined workflow. For instance, a particular customer may prefer a particular workflow of an ordered list of communication channels (e.g., SMS, voice, voice). The particular workflow can be stored in the workflows database 134. For this particular customer, the workflow updater 118 can access the workflows database 134 for the particular workflow, and identify primary and secondary channels according to the particular workflow. For example, when the customer submits a request by an API call as described above, the customer can select the desired workflow with an additional input field (e.g., Template). In one embodiment of the invention, the Template field can be displayed as a selectable list or drop down box of all available workflows. Other selectable methods are possible to those of skill in the art.

Figure 2:
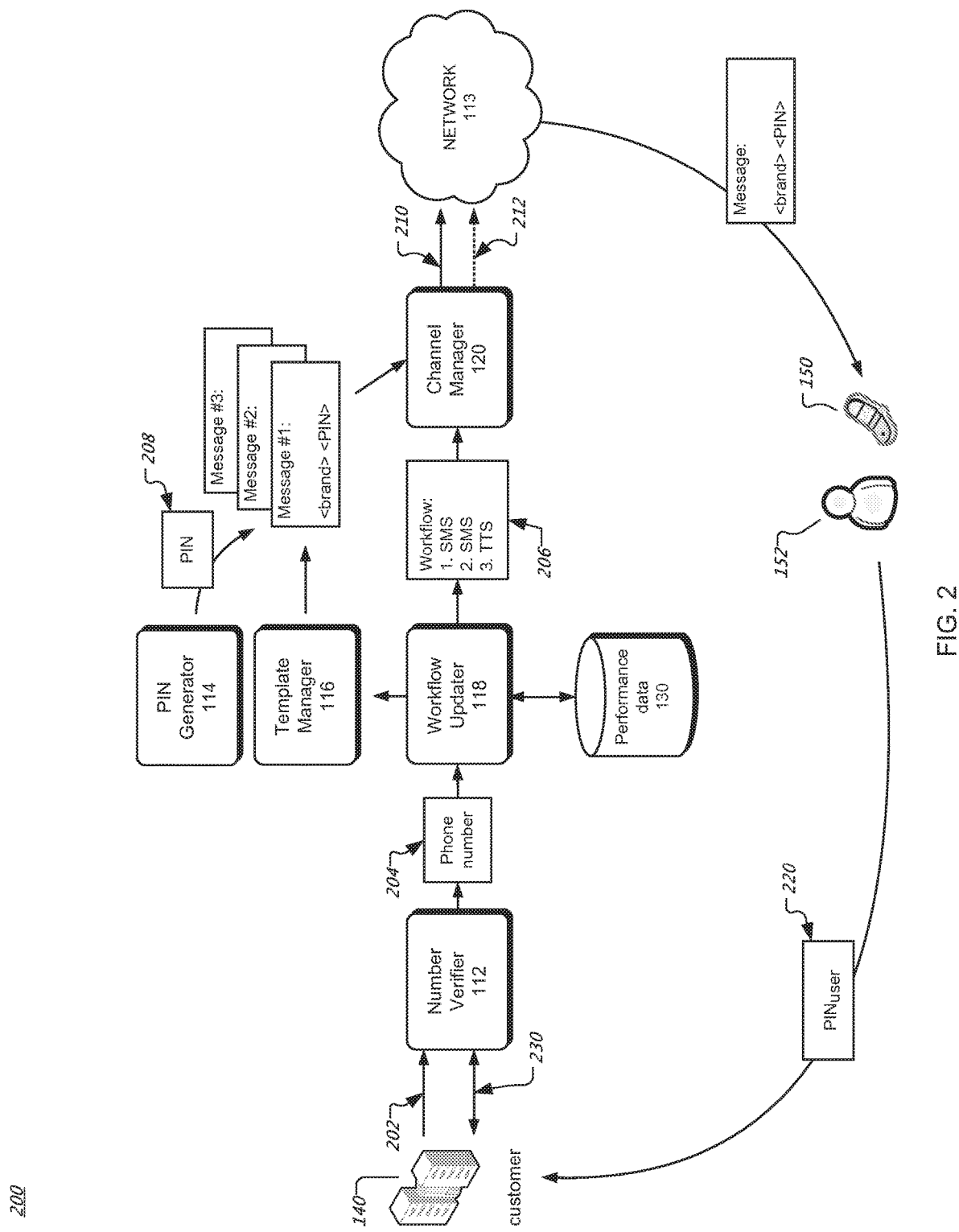
FIG. 2 is a data flow diagram of an example method for identity and phone number verification.

FIG. 2 is a data flow diagram of an example method for identity and phone number verification, based on the system illustrated in FIG. 1, for example. The method can be implemented using software components executing on one or more data processing apparatus that are part of the data center 121 described earlier.

The number verifier 112 receives a request from the computer system 140 of a customer, as indicated by the arrow 202. The request comprises a phone number that the customer wants to verify. The number verifier 112 can receive the request via an API call by the computer system 140, as described earlier. The number verifier 112 can determine whether the phone number is valid, and pass the phone number (204) to workflow updater 118.

The workflow updater 118 can identify a primary channel and one or more secondary channels for sending a message to the destination device 150 associated with the phone number. For instance, the workflow updater 118 can access the performance data database 130 and identify the primary and secondary channels based on respective performance data. The workflow updater 118 then passes the identified primary and secondary channels to the channel manager 120. For instance, the workflow updater 118 can pass the identified channels in a workflow file (or an object) 206 that lists a primary channel in SMS, a secondary channel in SMS, and another secondary channel in TTS.

The PIN generator 114 generates a password 208 (e.g., a PIN number, or a text string) that will be used to verify the phone number.

For each identified channel, the template manager 116 composes a message including the customer's information (e.g., brand name) and the password generated by the PIN generator. The template manager 116 then provides the messages for the identified channels to the channel manager 120.

As described earlier, the channel manager 120 first sends to the destination device 150 a corresponding message via the primary channel (210). After receiving the message, the user (152) of the destination device 150 can read (or listen to) the password in the message, and submit the password 220 to the computer system 140 of the customer. For instance, the user 152 can submit the password 220 through a web page served by the computer system 140.

The computer system 140 can send the password 220 (submitted by the user 152) to the number verifier 112 for verification (230). For instance, the computer system 140 can send the password 220 by an API call to the same API used for the initial request (202), with the following input fields:
API access key
API secret key
RequestID
PIN code
IP address API access key and API secret key are used to verify the customer. RequestID is the identifier for the initial request. PIN code is the password 220 submitted by the user 152. IP address can be an Internet Protocol address of the destination device 150, if available.

Based on the identifier of the initial request (RequestID), the number verifier 112 can compare the password 220 (submitted by the user 152) with the password 208 generated by the PIN generator 114 for the initial request (202). If the password 220 and the password 208 match, the number verifier 112 determines that it is a conversion event—i.e., the phone number Andrew the identity of the user are verified. If the conversion event has occurred within a specified time period (e.g., 45 seconds) from the time instance when the message was sent out to the destination device 150 via the primary channel, the number verifier 112 can record and store the conversion event (and the corresponding channel and phone number) in the performance data database 130.

In some implementations, the number verifier 112 can also determine a conversion event by determining whether the IP address is associated with the user 152. For instance, if the IP address is different from an IP address previously recorded for the phone number (e.g., for a previous request for verifying the phone number), the number verifier 112 can determine that a conversion event has not happened since the different IP addresses may indicate a fraudulent activity. As for another example, if the IP address has been associated with multiple (e.g., more than five) other phone numbers, or if the IP address has been associated with another phone number for multiple times (e.g., more than three times), the number verifier 112 can determine that a conversion event has not happened since the multiple uses of the IP address may be suspicious. In yet some implementations, an IP address can be included as an input field of the API call for the initial request (202). The number verifier 112 can determine whether to accept or reject the initial request based an existing mapping between phone numbers and IP addresses.

The password 220 submitted by the user 152 may not match the original password 208 because, for example, the user 152 has mistaken one or more digits (or characters) in the password 220. As another example, the password 220 may have been submitted not by a user, but by a fraudulent machine (e.g., a bot). In some implementations, the number verifier 112 can terminate the current workflow 206 if a number of failed passwords 220 exceeds a specified number (e.g., 3 times). The customer 140 can submit a new request (202) to re-start the phone number and identity verification.

If the number verifier 112 determines that a conversion event for the message of the primary channel has not occurred within the specified time period, the channel manager 120 can send to the destination device 150 a corresponding message via a secondary channel (212). The channel manager 120 can continue sending to the destination device 150 messages via secondary channels until a conversion event has occurred (within a specified time period), or until all secondary channels in the workflow 206 are exhausted.

The number verifier 112 can provide verification results to the computer system 140 (230) via the API with the following output fields:
RequestID
Status
Price
EventID RequestID is the identifier for the initial request. Status describes the result for the original request 202. The result can be successful (e.g., a conversion event has occurred within a specified time period), failed (e.g., no conversion event has occurred), or expired (e.g., no message has been successfully delivered within 5 minutes). Price is the fee (charged to the customer) for a successful verification.

EventID can describe a message type for a conversion event, for example, an SMS message or a voice call.

Figure 3:
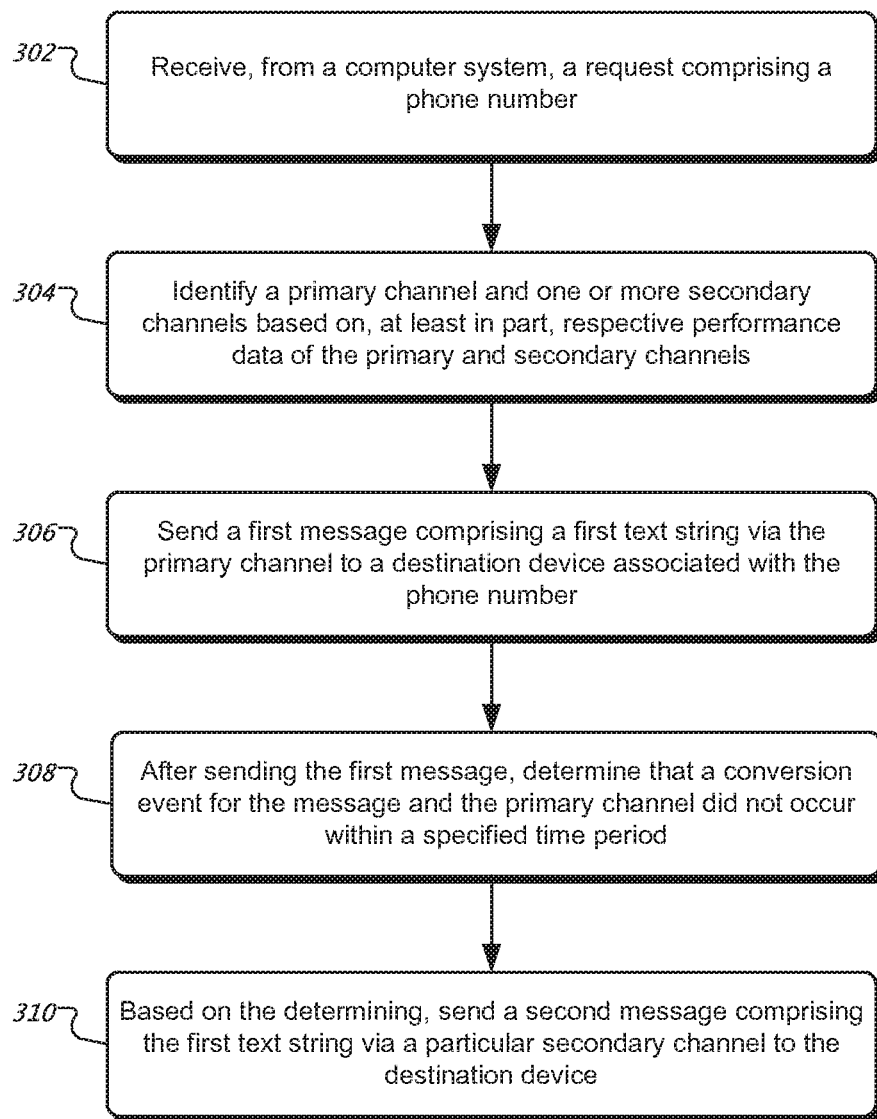
FIG. 3 is a flow chart of another example method for identity and phone number verification.

FIG. 3 is a flow chart of another example method for identity and phone number verification. The method can be implemented using software components executing on one or more data processing apparatus that are part of the data center 121 described earlier. The method begins by receiving, from a computer system, a request comprising a phone number (302). The method identifies a primary channel and one or more secondary channels based on, at least in part, respective performance data of the primary and secondary channels (304). The method sends a first message comprising a first text string via the primary channel to a destination device associated with the phone number (306). After sending the first message, the method determines that a conversion event for the message and the primary channel did not occur within a specified time period (308). Based on the determining, the method sends a second message comprising the first text string via a particular secondary channel to the destination device (310).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of verifying an identifier assigned to a communication device; comprising:
   receiving a request to verify an identifier assigned to a communication device, the request including the identifier and the request being received from a computer system controlled by a business;
   identifying a primary communication channel for communicating with the communication device, and a secondary communication channel for communicating with the communication device;
   causing a first verification message to be sent to the communications device via the primary communication channel;
   determining if a conversion event associated with the first verification message occurs within a predetermined period of time after the first verification message is sent to the communication device; and
   sending a second verification message to the communication device via the secondary communication channel when the conversion event is determined not to have occurred within the predetermined period of time.

2. The method of claim 1, wherein the request to verify an identifier is received via an application program interface (API).

3. The method of claim 2, further comprising generating the first verification message by:
   selecting a first message template; and
   inserting information into the first message template, the information including a name or identity of the business that controls the computer system from which the verification request was received.

4. The method of claim 3, wherein the first message template is selected based on an identity of the computer system from which the verification request was received.

5. The method of claim 3, wherein the first message template is selected based on an identity of the primary communication channel.

6. The method of claim 3, wherein the first message template is selected based on information included in the received verification request.

7. The method of claim 1, further comprising generating the first verification message by:
   selecting a first message template; and
   inserting information into the first message template, the information including a name or identity of the business that controls the computer system from which the verification request was received.

8. The method of claim 7, wherein the first message template is selected based on an identity of the computer system from which the verification request was received.

9. The method of claim 7, wherein the first message template is selected based on an identity of the primary communication channel.

10. The method of claim 7, wherein the first message template is selected based on information included in the received verification request.

11. A system for verifying an identifier assigned to a communication device; comprising:
- means for receiving a request to verify an identifier assigned to a communication device, the request including the identifier and the request being received from a computer system controlled by a business;
- means for identifying a primary communication channel for communicating with the communication device and a secondary communication channel for communicating with the communication device;
- means for causing a first verification message to be sent to the communications device via the primary communication channel;
- means for determining if a conversion event associated with the first verification message occurs within a predetermined period of time after the first verification message is sent to the communication device; and
- means for causing a second verification message to be sent to the communication device via the secondary communication channel when the conversion event is determined not to have occurred within the predetermined period of time.

12. A system for verifying an identifier assigned to a communication device; comprising:
- a number verifier comprising at least one processor that receives a request to verify an identifier assigned to a communication device, the request including the identifier and the request being received from a computer system controlled by a business;
- a channel manager comprising at least one processor that identifies a primary communication channel for communicating with the communication device and a secondary communication channel for communicating with the communication device and that causes a first verification message to be sent to the communications device via the primary communication channel;
- wherein the number verifier determines if a conversion event associated with the first verification message occurs within a predetermined period of time after the first verification message is sent to the communication device; and
- wherein the channel manager causes a second verification message to be sent to the communication device via the secondary communication channel when the conversion event is determined not to have occurred within the predetermined period of time.

13. The system of claim 12, wherein the request to verify an identifier is received by the number verifier via an application program interface (API).

14. The system of claim 13, further comprising a template manager that generates the first verification message by:
- selecting a first message template; and
- inserting information into the first message template, the information including a name or identity of the business that controls the computer system from which the verification request was received.

15. The system of claim 14, wherein the template manager selects the first message template based on an identity of the computer system from which the verification request was received.

16. The system of claim 14, wherein the template manager selects the first message template based on an identity of the primary communication channel.

17. The system of claim 14, wherein the template manager selects the first message template based on information included in the received verification request.

18. The system of claim 12, further comprising a template manager that generates the first verification message by:
- selecting a first message template; and
- inserting information into the first message template, the information including a name or identity of the business that controls the computer system from which the verification request was received.

19. The system of claim 18, wherein the template manager selects the first message template based on an identity of the computer system from which the verification request was received.

20. The system of claim 18, wherein the template manager selects the first message template based on an identity of the primary communication channel.

21. The system of claim 18, wherein the template manager selects the first message template based on information included in the received verification request.

* * * * *